United States Patent
Robinson et al.

(10) Patent No.: US 10,472,174 B1
(45) Date of Patent: Nov. 12, 2019

(54) INDUCED MAGNETIC FIELD TOTE TRANSFER CHIMNEY AND METHODS OF USE

(71) Applicant: Toyota Motor Engineering & Manufacturing North America, Inc., Plano, TX (US)

(72) Inventors: John D. Robinson, Georgetown, KY (US); Cameron M. Hodge, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/199,673

(22) Filed: Nov. 26, 2018

(51) Int. Cl.
*B65G 13/075* (2006.01)
*B65G 47/52* (2006.01)
*B65G 39/08* (2006.01)
*H02K 49/04* (2006.01)

(52) U.S. Cl.
CPC ........... *B65G 13/075* (2013.01); *B65G 39/08* (2013.01); *B65G 47/52* (2013.01); *H02K 49/04* (2013.01)

(58) Field of Classification Search
CPC ...... B65G 11/20; B65G 47/52; B65G 13/075; B65G 1/08; H02K 49/04
USPC ...................................................... 193/35 A
See application file for complete search history.

(56) References Cited

U.S. PATENT DOCUMENTS

| | | | |
|---|---|---|---|
| 3,352,397 A * | 11/1967 | Becker | B65G 9/006 193/35 A |
| 4,000,808 A * | 1/1977 | Pradon | B65G 43/08 198/572 |
| 4,629,059 A * | 12/1986 | Allinquant | B65G 47/8838 193/35 A |
| 5,366,044 A | 11/1994 | Jamieson et al. | |
| 6,467,601 B2 * | 10/2002 | Schmale | B65G 13/075 193/35 A |
| 7,445,111 B2 | 11/2008 | Kitazumi et al. | |
| 7,503,451 B2 | 3/2009 | Hirasawa et al. | |
| 8,607,965 B2 * | 12/2013 | Sejourne | B65G 39/12 193/35 A |
| 9,150,116 B2 | 10/2015 | Matscheko et al. | |
| 10,035,421 B2 | 7/2018 | McGowan et al. | |

(Continued)

FOREIGN PATENT DOCUMENTS

| | | |
|---|---|---|
| FR | 2553741 | 4/1985 |
| JP | 1105608 | 1/1999 |

*Primary Examiner* — James R Bidwell
(74) *Attorney, Agent, or Firm* — Dinsmore & Shohl LLP

(57) ABSTRACT

Methods, systems, and apparatuses for using an induced magnetic field tote transfer chimney including a pair of opposed roller conveyer frames comprising a plurality of rollers disposed in opposed roller pairs, the plurality of rollers comprising a combination of different types of rollers, the combination comprising a magnetic roller and at least one other roller, the at least one other roller being one of a standard uncoated roller, a standard coated roller, or another magnetic roller, each magnetic roller being a magnetic coated roller or a magnetic uncoated roller. The induced magnetic field tote transfer chimney has a conveying direction extending in a vertical direction and each magnetic roller disposed in the induced magnetic field tote transfer chimney is configured to induce induction braking to reduce product speed and generate an induction braking force proportional to speed.

20 Claims, 3 Drawing Sheets

(56) References Cited

U.S. PATENT DOCUMENTS

| | | | |
|---|---|---|---|
| 2007/0256908 A1* | 11/2007 | Yazaki | B65G 1/08 193/35 A |
| 2016/0145046 A1* | 5/2016 | Kupper | B65G 13/075 193/35 A |
| 2017/0087728 A1* | 3/2017 | Prahlad | B25J 15/0085 |

* cited by examiner

US 10,472,174 B1

INDUCED MAGNETIC FIELD TOTE TRANSFER CHIMNEY AND METHODS OF USE

TECHNICAL FIELD

The present specification generally relates to an induced magnetic field tote transfer chimney and methods of use, and more specifically, to a combination of one or more different types of rollers in the induced magnetic field tote transfer chimney and methods of use.

BACKGROUND

Counterbalance transfer systems in an industrial conveyance environment to transfer totes tend to require specified mechanical, powered inputs to redirect stored potential energy into kinetic transfer, involve a high count of moving parts, and have preventative maintenance needs to maintain system parts.

Accordingly, a need exists for alternative transfer system methods and apparatuses in an industrial conveyance environment.

SUMMARY

In one embodiment, an induced magnetic field tote transfer chimney may include a pair of opposed roller conveyer frames comprising a plurality of rollers disposed in opposed rollers pairs, the plurality of rollers comprising a combination of different types of rollers, the combination comprising a magnetic roller and at least one other roller, the at least one other roller being one of a standard uncoated roller, a standard coated roller, or another magnetic roller, each magnetic roller being a magnetic coated roller or a magnetic uncoated roller. The induced magnetic field tote transfer chimney may have a conveying direction extending in a vertical direction and each magnetic rollers disposed in the induced magnetic field tote transfer chimney is configured to induce induction braking to reduce product speed and generate an induction braking force proportional to speed.

In another embodiment, induced magnetic field tote transfer chimney system may include an upper tote conveyor line configured to convey one or more totes in a horizontal direction, a lower tote conveyor line configured to convey the one or more totes in the horizontal direction, and an induced magnetic field tote transfer chimney disposed between the upper tote conveyor line and the lower tote conveyor line and configured to convey one or more totes downwardly along a vertical direction. The induced magnetic field tote transfer chimney may include a pair of opposed roller conveyer frames comprising a plurality of rollers disposed in opposed roller pairs, the plurality of rollers comprising a combination of different types of rollers, the combination comprising a magnetic roller and at least one other roller, the at least one other roller being one of a standard uncoated roller, a standard coated roller, or another magnetic roller, each magnetic roller being a magnetic coated roller or a magnetic uncoated roller, wherein the induced magnetic field tote transfer chimney has a conveying direction extending the vertical direction and each magnetic rollers disposed in the induced magnetic field tote transfer chimney is configured to induce induction braking to reduce product speed and generate an induction braking force proportional to speed.

In another embodiment, a method for using an induced magnetic field tote transfer chimney system to generate an induction braking force to apply braking forces to a vertically conveyed tote may include conveying a tote along an upper tote conveyor line configured to convey one or more totes in a horizontal direction, and receiving the tote into an induced magnetic field tote transfer chimney disposed between the upper tote conveyor line and a lower tote conveyor line and configured to convey one or more totes downwardly along a vertical direction. The induced magnetic field tote transfer chimney may include a pair of opposed roller conveyer frames comprising a plurality of rollers disposed in opposed roller pairs, the plurality of rollers comprising a combination of different types of rollers, the combination comprising a magnetic roller and at least one other roller, the at least one other roller being one of a standard uncoated roller, a standard coated roller, or another magnetic roller, each magnetic roller being a magnetic coated roller or a magnetic uncoated roller, the combination of different types of rollers comprising multiple combinations of different types of rollers. The method may further include conveying the tote through the induced magnetic field tote transfer chimney to generate the induction braking force proportional to speed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
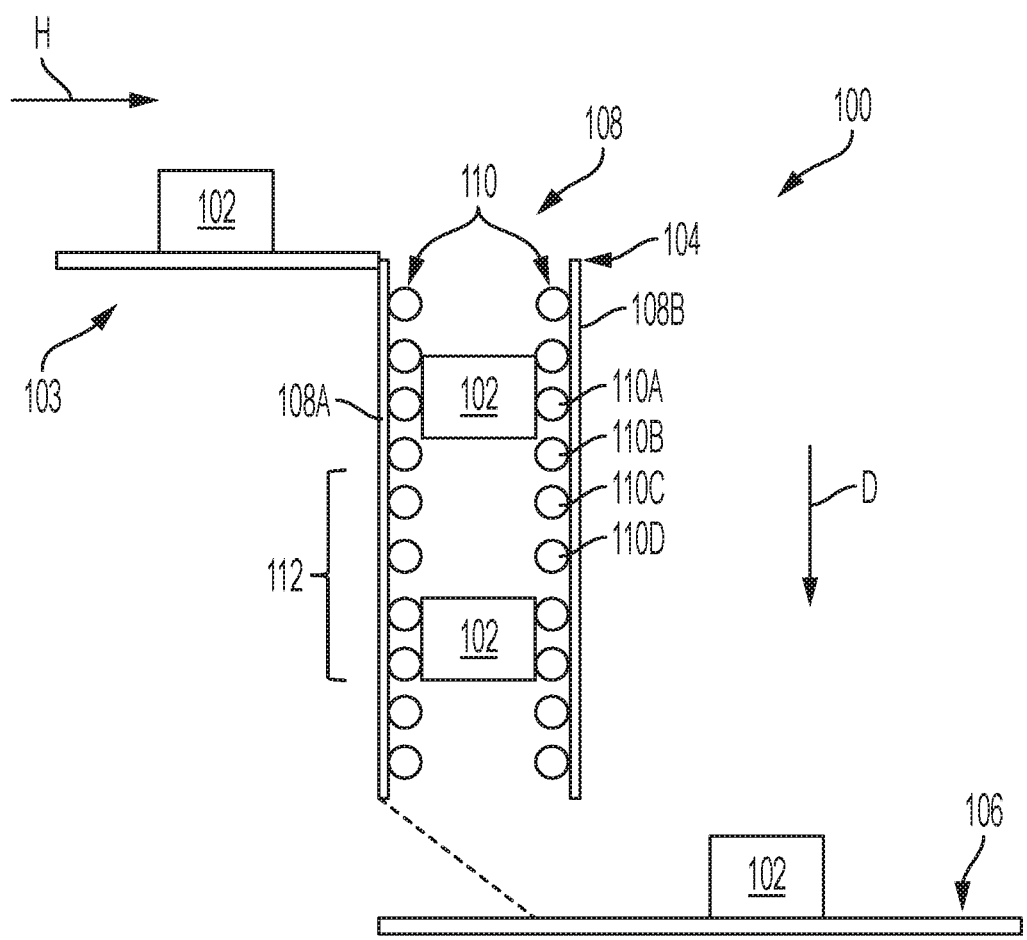
FIG. 1 schematically illustrates a front view of an induced magnetic field tote transfer chimney associated with tote conveyor lines, according to one or more embodiments shown and described herein.

Reference will now be made in detail to embodiments of an induced magnetic field tote transfer chimney, examples of which are illustrated in the accompanying drawings. Embodiments of the present disclosure are directed to an induced magnetic field tote transfer chimney device including a pair of parallel roller conveyer frames mounted in a vertical position. A plurality of rollers may be assembled to the frames with adjustable rods to adjust spacing and desired friction values. Whenever possible, the same reference numerals will be used throughout the drawings to refer to the same or like parts. Various embodiments of one or more rollers associated with an induced magnetic field tote transfer chimney will be described in further detail herein with specific reference to the appended drawings.

FIG. 1 generally depicts an embodiment of an induced magnetic field tote transfer chimney system 100 to transfer one or more totes 102 in an industrial conveyance environment. The induced magnetic field tote transfer chimney system 100 includes an upper tote conveyor line 103, a lower tote conveyor line 106, and an induced magnetic field tote transfer chimney 104. The upper tote conveyor line 103 and the lower tote conveyor line 106 are configured to convey one or more totes 102 in a horizontal direction H, and the induced magnetic field tote transfer chimney 104 is configured to convey the one or more totes 102 downwardly along a vertical direction D.

The induced magnetic field tote transfer chimney 104 includes a pair of opposed roller conveyer frames 108 including a first frame 108A and a second frame 108B. In embodiments, the pair of opposed roller conveyer frames 108 may be opposed parallel to one another. The pair of opposed roller conveyer frames 108 are mounted in a vertical position and include a plurality of rollers 110. The plurality of rollers 110 include a combination 112 of one or more standard uncoated rollers 110A, standard coated rollers 110B, magnetic uncoated rollers 110C, and magnetic coated rollers 110D. It is to be understood that any combination 112 of the plurality rollers 110 described herein is within the scope of this disclosure.

Figure 2:
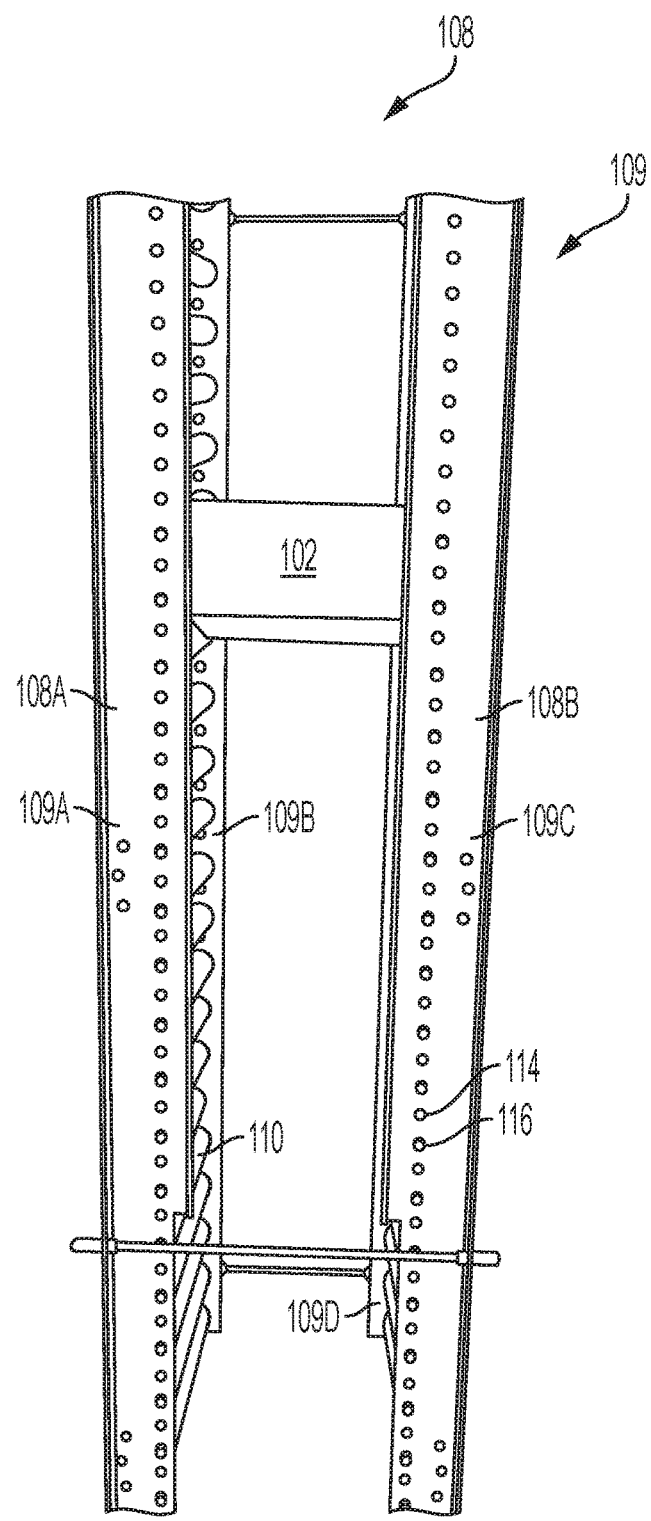
FIG. 2 schematically illustrates an isometric view of the induced magnetic field tote transfer chimney of FIG. 1.
Figure 3:
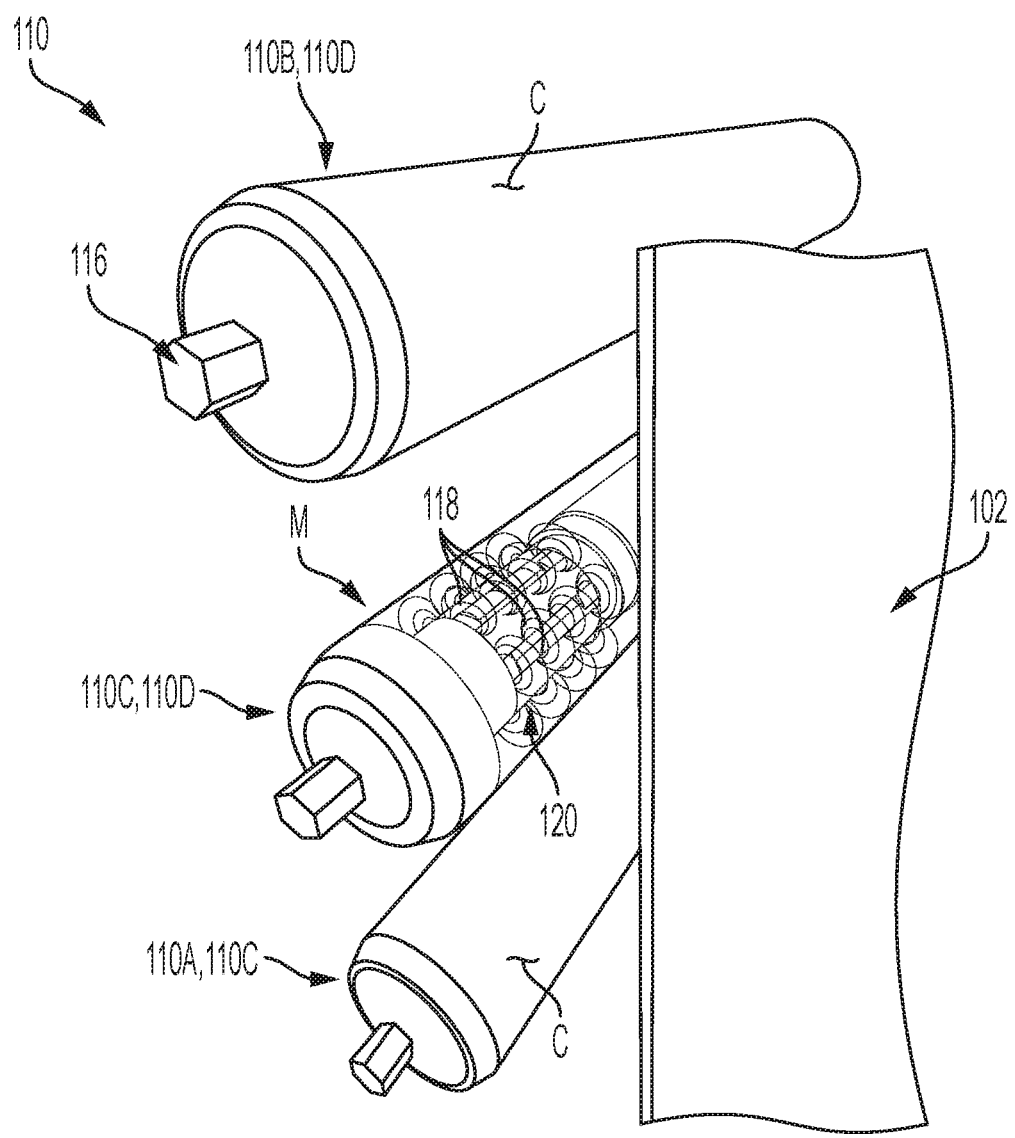
FIG. 3 schematically illustrates a plurality of rollers of the induced magnetic field tote transfer chimney of FIG. 1.

By way of example, and not as a limitation, and referring to FIGS. 1-3, the plurality of rollers 110 described herein may include a combination 112 of standard uncoated rollers 110A, magnetic uncoated rollers 110C, and magnetic coated rollers 110D inserted through end prongs 116 (FIG. 2) into frame insertion points 114 of each of the first frame 108A and the second frame 108B and adjustable through adjustable threaded rods with respect to the first frame 108A and the second frame 108B.

Each frame 108A, 108B include a pair of side walls 109 defining the frame insertion points 114. As a non-limiting example, the frame insertion points 114 are vertically disposed along each parallel side wall 109A-D of the first frame 108A or the second frame 108B, which parallel side walls 109A-109B and 109C-109D are attached together with at least the plurality of rollers 110.

Each roller 110 includes a pair of end prongs 116 on opposing sides, one end prong 116 of the roller 110 configured for receipt and removable attachment to a frame insertion point 114 of a first side wall 109A of the first frame 108A. The other end prong 116 of the roller 110 is configured for receipt and removable attachment to a frame insertion point 114 of a second side wall 109B of the first frame 108A. The first and second frame insertion points 114 of the first frame 108A are disposed in parallel and aligned along the same longitudinal axis defined between the pair of end prongs 116 of the roller 110. Similarly, one end prong 116 of another roller 110 is configured for receipt and removable attachment to a frame insertion point 114 of a first side wall 109C of the second frame 108B. The other end prong 116 of the another roller 110 is configured for receipt and removable attachment to a frame insertion point 114 of a second side wall 109D of the second frame 108B. The first and second frame insertion points 114 of the second frame 108B are disposed in parallel and aligned along the same longitudinal axis defined between the pair of end prongs 116 of the another roller 110.

In an embodiment, a standard uncoated (non-magnetic) roller 110A may be made of a bare finished metal such as an aluminum alloy that allows for a part such as a tote 102 to slide along the roller 110A without minimal resistance due to a low friction coefficient. Referring to FIG. 3, a magnetic uncoated roller 110C may be made of the same bare finished metal material and internally include within the roller 110C a plurality of magnets 118 with non-opposing poles to generate an eddy current 120 in a same plane as the roller 110C to provide for magnetic/induction braking. Such induction braking results in a generation of eddy currents 120. A magnetic coated roller 110D may include an additional layer of a polyurethane coating outside the roller 110D to provide a smooth rubber plane allowing for additional friction along with the magnetic braking. Induction brakes such as eddy current brakes reduce product speed and are disposed in the vertical tote transfer chimney to allow for a braking force proportional to speed.

Referring to FIG. 3, eddy currents 120 are generated as loops of electrical current induced by a changing magnetic field in a conductor to flow in closed loops within conductors in a plane perpendicular to the magnetic field. As a non-limiting example, the magnetic uncoated roller 110C or the magnetic coated roller 110D may internally include within the roller 110C, 110D the plurality of magnets 118 with non-opposing poles to generate the eddy current 120 in a same plane as the roller 110C, 110D where an air gap exists between the plurality of magnets 118 and an internal surface of the roller 110C, 110D. The eddy current 120 generates a magnetic force, which eddy generated magnetic force opposes the magnetic field change that created the eddy current 120 to react with respect to the magnetic field source as cause induction braking. In embodiments, the internal surface may be comprised of copper. The plurality of magnets 118 may be permanent fixed magnets within the roller 110 and may include six magnets, while other magnet amounts are within the scope of this disclosure.

As shown in FIG. 3, a roller 110 may include a coating C and be a standard coated roller 110B or a magnetic coated roller 110D. Alternatively, a roller 110 may be uncoated U and be a standard uncoated roller 110A or a magnetic uncoated roller 110C. In embodiments, a roller 110 may be magnetic M and be a magnetic uncoated roller 110C or a magnetic coated roller 110D.

By way of example, and not as a limitation, the one or more combinations 112 may include multiple combinations of different types of rollers. The multiple combinations may include combination sequences that may alternate and/or be an alternating combination sequence and/or be combined with other combination sequences or alternating combination sequences or other multiple combinations of different types of rollers. The one or more combinations 112 may be disposed in the pair of opposed roller conveyer frames 108 in a predetermined sequence at least partially based on a size of a tote 102 to be conveyed and such that at least one magnetic roller is configured to be in contact with a side surface of the tote 102 in the induced magnetic field tote transfer chimney 104 as the tote 102 is conveyed in the vertical direction D such that a braking force is applied to the tote 102 as the tote 102 travels along the conveying direction.

Additionally or alternatively, the one or more combinations 112 may be disposed in the pair of opposed roller conveyer frames 108 in a predetermined sequence at least partially based on a material of a tote 102. As a non-limiting example, when the tote 102 is comprised of a hard plastic material such that friction is an issue, a sequence of coated rollers may be used for the combination 112, while for alternative materials such as rubber in which friction is less of an issue, a sequence of uncoated rollers may be used for the combination 112.

The one or more combinations 112 may include a combination sequence of a standard uncoated roller 110A and a magnetic uncoated roller 110C, a standard uncoated roller 110A and a magnetic coated roller 110D, a standard coated roller 110B and a magnetic uncoated roller 110C, a standard coated roller 110B and a magnetic coated roller 110D, or combinations thereof. Alternatively or additionally, the one or more combinations 112 may include another combination sequence of two standard rollers followed by a magnetic roller. This may include a combination sequence of a pair of standard uncoated rollers 110A and a magnetic uncoated roller 110C, pair of standard coated rollers 110B and a magnetic uncoated roller 110C, two standard uncoated rollers 110A and a magnetic coated roller 110D, pair of standard coated rollers 110B and a magnetic coated roller 110D, or combinations thereof. This may additionally or alternatively include a combination sequence of a standard uncoated roller 110A and a standard coated roller 110B in either order and a magnetic uncoated roller 110C, a combination alternating sequence of a standard uncoated roller 110A and a standard coated rollers 110B in either order and a magnetic coated roller 110D, or combinations thereof. Alternatively or additionally, the one or more combinations 112 may include only magnetic rollers. A non-limiting example includes a combination sequence of a magnetic uncoated roller 110C and a magnetic coated roller 110D, or a magnetic coated roller 110D and a magnetic uncoated roller 110C, or combinations thereof.

The induced magnetic field tote transfer chimney system 100 provides a controlled, stand-alone apparatus and method to safely displace totes 102 such as equiangular quadrilateral totes at a controlled velocity and stability in a downward vertical direction through the induced magnetic field tote transfer chimney 104 without requiring additional electricity, air, or water pressure for operation. The induced magnetic field tote transfer chimney 104 may be mounted in a superposition to an adjoining horizontal decline conveyor to feed totes thereto or may feed directly to a floor level to, for example, stack totes. Through use of eddy current brakes through the plurality of rollers 110 removably and/or adjustably attached to the conveyor frames, the induced magnetic field tote transfer chimney 104 is able to automatically adjust the rate of deceleration of a payload application as a function of mass.

Accordingly, the present disclosure describes an induced magnetic field tote transfer chimney 104 that may include a pair of opposed roller conveyer frames 108 mounted in a vertical position and including a plurality of rollers 110 including a combination 112 of one or more standard uncoated, standard coated, magnetic coated, and magnetic uncoated rollers assembled to the frames 108 with adjustable threaded rods to adjust spacing between adjacent rollers and/or desired friction values. By way of example, and not as a limitation, spacing between the plurality of rollers 110 may be adjusted based on friction values associated with a tote 102 to be conveyed by the induced magnetic field tote transfer chimney 104. Further, the present disclosure describes that the induced magnetic field tote transfer chimney 104 may include induction brakes caused by the magnetic rollers 110C, 110D disposed in the vertical induced magnetic field tote transfer chimney 104 to reduce product speed. The induced magnetic field tote transfer chimney 104 thus allows for an induction braking force proportional to speed, and use of eddy current brakes from the magnetic rollers 110C and/or 110D of the combination 112 of one or more standard uncoated, standard coated, magnetic coated, and magnetic uncoated rollers disposed within the pair of opposed roller conveyer frames 108 to automatically adjust the rate of deceleration of a payload application as a function of mass.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An induced magnetic field tote transfer chimney comprising:
   a pair of opposed roller conveyer frames comprising a plurality of rollers disposed in opposed roller pairs, the plurality of rollers comprising a combination of different types of rollers, the combination comprising a magnetic roller and at least one other roller, the at least one other roller being one of a standard coated roller, a standard uncoated roller, or another magnetic roller, each magnetic roller being a magnetic coated roller or a magnetic uncoated roller, and
   wherein the induced magnetic field tote transfer chimney has a conveying direction extending in a vertical direction and each magnetic roller disposed in the induced magnetic field tote transfer chimney is configured to induce induction braking to reduce product speed and generate an induction braking force proportional to speed.

2. The induced magnetic field tote transfer chimney of claim 1, wherein the induction braking comprises generation of eddy currents.

3. The induced magnetic field tote transfer chimney of claim 1, wherein the plurality of rollers are assembled to the pair of opposed roller conveyer frames with adjustable rods to adjust spacing between adjacent rollers.

4. The induced magnetic field tote transfer chimney of claim 1, wherein the pair of opposed roller conveyer frames comprise a first frame and a second frame, the first frame opposed and parallel to the second frame.

5. The induced magnetic field tote transfer chimney of claim 4, wherein each roller comprises a pair of end prongs on opposing side, one end prong of each roller configured for receipt and removable attachment to a frame insertion point of a first side wall of one of the first frame or the second frame, the other end prong of each roller configured for receipt and removable attachment to a frame insertion point of a second side wall of the one of the first frame or the second frame.

6. The induced magnetic field tote transfer chimney of claim 1, wherein the induction braking comprises use of eddy current brake forces generated from the each magnetic roller of the combination of different types of rollers within the pair of opposed roller conveyer frames to automatically adjust a rate of deceleration of a payload application as a function of mass.

7. The induced magnetic field tote transfer chimney of claim 1, wherein the combination of different types of rollers comprises multiple combinations of different types of rollers.

8. The induced magnetic field tote transfer chimney of claim 7, wherein the multiple combinations of different types of rollers are disposed in the pair of opposed roller conveyer frames in a predetermined combination comprising at least one magnetic roller that is configured to be in contact with a side surface of a tote to be conveyed such that a braking force is applied to the tote as the tote travels along the conveying direction.

9. The induced magnetic field tote transfer chimney of claim 7, wherein the multiple combinations of different types of rollers are disposed in the pair of opposed roller conveyer frames in a predetermined combination comprising a pair of non-magnetic rollers and the magnetic roller.

10. The induced magnetic field tote transfer chimney of claim 7, wherein the multiple combinations of different types of rollers are disposed in the pair of opposed roller conveyer frames in a predetermined combination comprising:
a magnetic uncoated roller and a magnetic coated roller, a magnetic coated roller and a magnetic uncoated roller, or combinations thereof.

11. The induced magnetic field tote transfer chimney of claim 7, wherein the multiple combinations of different types of rollers are disposed in the pair of opposed roller conveyer frames in a predetermined sequence comprising the magnetic roller and a non-magnetic roller.

12. An induced magnetic field tote transfer chimney system comprising:
an upper tote conveyor line configured to convey one or more totes in a horizontal direction;
a lower tote conveyor line configured to convey the one or more totes in the horizontal direction; and
an induced magnetic field tote transfer chimney disposed between the upper tote conveyor line and the lower tote conveyor line and configured to convey the one or more totes downwardly along a vertical direction, wherein the induced magnetic field tote transfer chimney comprises:
a pair of opposed roller conveyer frames comprising a plurality of rollers disposed in opposed roller pairs, the plurality of rollers comprising a combination of different types of rollers, the combination comprising a magnetic roller and at least one other roller, the at least one other roller being one of a standard uncoated roller, a standard coated roller, or another magnetic roller, each magnetic roller being a magnetic coated roller or a magnetic uncoated roller, and wherein the induced magnetic field tote transfer chimney has a conveying direction extending the vertical direction and each magnetic roller disposed in the induced magnetic field tote transfer chimney is configured to induce induction braking to reduce product speed and generate an induction braking force proportional to speed.

13. The induced magnetic field tote transfer chimney system of claim 12, wherein the combination of different types of rollers comprises multiple combinations of different types of rollers.

14. The induced magnetic field tote transfer chimney system of claim 13, wherein the multiple combinations of different types of rollers are disposed in the pair of opposed roller conveyer frames in a predetermined sequence comprising a pair of non-magnetic rollers and the magnetic roller.

15. The induced magnetic field tote transfer chimney system of claim 13, wherein the multiple combinations of different types of rollers are disposed in the pair of opposed roller conveyer frames in a predetermined sequence comprising:
a magnetic uncoated roller and a magnetic coated roller, a magnetic coated roller and a magnetic uncoated roller, or combinations thereof.

16. The induced magnetic field tote transfer chimney system of claim 13, wherein the multiple combinations of different types of rollers are disposed in the pair of opposed roller conveyer frames in a predetermined sequence comprising the magnetic roller and a non-magnetic roller.

17. A method for using an induced magnetic field tote transfer chimney system to generate an induction braking force to apply braking forces to a vertically conveyed tote, the method comprising:
conveying a tote along an upper tote conveyor line configured to convey one or more totes in a horizontal direction;
receiving the tote into an induced magnetic field tote transfer chimney disposed between the upper tote conveyor line and a lower tote conveyor line and configured to convey the one or more totes downwardly along a vertical direction, wherein the induced magnetic field tote transfer chimney comprises:
a pair of opposed roller conveyer frames comprising a plurality of rollers disposed in opposed roller pairs, the plurality of rollers comprising a combination of different types of rollers, the combination comprising a magnetic roller and at least one other roller, the at least one other roller being one of a standard uncoated roller, a standard coated roller, or another magnetic roller, each magnetic roller being a magnetic coated roller or a magnetic uncoated roller, the combination of different types of rollers comprising multiple combinations of different types of rollers; and
conveying the tote through the induced magnetic field tote transfer chimney to generate the induction braking force proportional to speed.

18. The method of claim 17, further comprising
disposing the combination in the pair of opposed roller conveyer frames in an adjustable predetermined combination such that at least one magnetic roller is in contact with a side surface of a tote being conveyed and a generated induction braking force is applied to the tote as the tote travels in a conveying direction extending in the vertical direction; and
generating the induction braking force as eddy current brake forces on the tote in the induced magnetic field tote transfer chimney as the tote is conveyed by the plurality of rollers in the vertical direction.

19. The method of claim 17, wherein the plurality of rollers are assembled to the pair of opposed roller conveyer frames with adjustable rods to adjust spacing between adjacent rollers.

20. The method of claim 17, wherein the multiple combinations of different types of rollers are disposed in the pair of opposed roller conveyer frames in an adjustable predetermined combination at least partially based on a size of a tote to be conveyed by the plurality of rollers, a friction value associated with a material of the tote, or both.

* * * * *